UNITED STATES PATENT OFFICE 2,608,547

VINYL HALIDE RESIN STABILIZED WITH BASIC LEAD PHTHALATE

John G. Hendricks, Chatham, N. J., and Hugo J. Ratti, Manhasset, N. Y., assignors to National Lead Company, New York, N. Y., a corporation of New Jersey No Drawing. Application June 10, 1949, Serial No. 98,409

3 Claims. (Cl. 260—45.75)

This invention relates to vinyl resin compositions and more particularly to such compositions stabilized as to physical properties, manifestly color, against the action of light and heat.

It is well-known that vinyl resin compositions are sensitive to the action of light and heat and the acidic degradation products formed by such action react to effect deterioration of color and other properties. Exposure of vinyl resins to heat particularly, often occurs during compounding and processing of compositions containing them. Therefore, to stabilize such compositions against this action, so-called heat stabilizers have been proposed by the prior art. These stabilizers have often consisted of simple or complex salts of lead. Those heretofore used or proposed, however, have suffered either from the disadvantage of being difficult to disperse in the resin compositions or they have not provided the desired degree of stabilization.

It is, therefore, the object of this invention to provide an improved vinyl resin composition stable against the action of light and heat. This and other objects of the invention will be apparent from the following description thereof.

This invention in its broadest aspects contemplates the provision of a vinyl resin composition which includes as a stabilizing agent from ¼ to 15% and preferably about 5.0% of the weight of said resin of a basic lead phthalate compound. The basic lead phthalate compound may be introduced into the composition at any desired stage of the manufacture preferably and advantageously before or during the milling or mixing of the ingredients. It has been found that the basic lead phthalate compound disperses readily in the mixture of vinyl resin and other compounding agents so that a uniform dispersion is obtained.

By the term "vinyl halide resin" we mean to include the various vinyl resin compounds and combinations normally considered to be included within this term. These will include vinyl halide such as, for instance, polyvinyl chloride; vinyl resins produced by conjointly polymerizing a vinyl halide with, for instance, vinyl acetate or other vinyl ester; vinyl resins produced by conjoint polymerization with an arcylic compound, as for intance, ethyl methacrylate or methyl methacrylate; and co-polymers of a vinyl halide with other vinyl halide resin copolymers as, for instance, vinylidene halide. Therefore, the term vinyl halide resin as herein employed will include any of the above types of vinyl resins and mixtures or combinations of these.

The basic lead phthalate compounds suitable for use as stabilizing agents are:

(1) Monobasic lead phthalate having the formula $PbO \cdot PbC_6H_4(COO)_2$ and (2) dibasic lead phthalate having the formula

$$2PbO \cdot PbC_6H_4(COO)_2 \cdot \tfrac{1}{2}H_2O$$

These compounds are employed in amounts of from 0.25% to 15% based on the weight of the vinyl halide resin in the composition which will ordinarily comprise a substantial or preponderant proportion thereof and conventional plasticizers and other addition agents known in the art. Compositions prepared according to this invention and containing from 0.25% to 15% of a basic lead phthalate compound will retain a light, pale color after exposure to heat and/or light under conditions which would result in substantial darkening of prior art compositions.

In order to illustrate more particularly the compositions of this invention the following examples are shown:

EXAMPLE 1

65 parts of vinyl chloride-vinyl acetate co-polymer were mixed with 3.25 parts of monobasic lead phthalate and then 35 parts of dioctylphthalate plasticizer were added to the mix and mixing was completed on a heated two roll mill of conventional type. The composition so prepared was white and opaque.

EXAMPLE 2

65 parts of vinyl chloride-vinyl acetate co-polymer were mixed with 3.25 parts of dibasic lead phthalate and then 35 parts of dioctylphthalate plasticizer were added to the mix and mixing was completed on a heated two roll mill of conventional type. The composition so prepared was white and opaque.

Comparative tests of the above examples were made by exposing sheeted samples of the vinyl composition products to the effect of 300° F. temperature for from 2 to 9 hours. The results of these heat exposure tests are tabulated below wherein changes in color are indicative of degradation:

TABLE 1
*Heat Stability*

Color of Stabilized Compositions

| Hours at 300° F. | Example 1 | Example 2 |
| --- | --- | --- |
| Initial | pale ivory | pale ivory |
| After 2 hours | do | cream. |
| After 5 hours | light tan | Do. |
| After 7 hours | do | Do. |
| After 9 hours | tan | Do. |

A composition similar to that described in Example 1, but containing no basic lead phthalate stabilizer was tested under similar conditions and showed the results shown below in Table 2.

TABLE 2

| Hours at 300° F. | Color of Unstabilized Compositions |
| --- | --- |
| Initial | Brown. |
| After 2 hrs | Dark brown. |
| After 4 hrs | Black. |

As is clearly evident from the table above, the compositions of this invention show excellent resistance to the effect of heat even after 9 hours exposure at 300° F., while the unstabilized composition darkened immediately on heating and was black after 4 hours.

Light tests made by exposing sheeted sample of the products of Examples 1 and 2 and the unstabilized composition described above to radiation from a carbon arc lamp are shown in Table 3 below.

TABLE 3
*Light Stability*

| | Example 1 | Example 2 | Unstabilized Compositions |
| --- | --- | --- | --- |
| Initial Spotting | 500 hours | 500 hours | less than 300 hours. |
| Failure | more than 600 hrs. | more than 600 hrs. | 350 hours. |

The Table 3 above illustrates the substantially improved light stability of the products of this invention.

The foregoing examples of the compositions of this invention serve to illustrate specific embodiments thereof. It will be understood that a variety of plasticizers, coloring and modifying agents may be present without significantly effecting the stabilization accomplished. Furthermore, the stabilized compositions may contain other stabilizing agents.

While this invention has been described and illustrated by the examples shown, it is not intended to be strictly limited thereto and other modifications may be employed within the limits of the following claims:

We claim:
1. A composition comprising a vinyl halide resin and from 0.25% to 15% based on the weight of said resin of a heat and light stabilizer comprising basic lead phthalate.
2. A composition comprising a vinyl halide resin and from 0.25% to 15% based on the weight of said resin of a heat and light stabilizer comprising monobasic lead phthalate.
3. A composition comprising a vinyl halide resin and from 0.25% to 15% based on the weight of said resin of a heat and light stabilizer comprising dibasic lead phthalate.

JOHN G. HENDRICKS.
HUGO J. RATTI.

REFERENCES CITED

The following references are of record in the file of this patent:

UNITED STATES PATENTS

| Number | Name | Date |
| --- | --- | --- |
| 2,141,126 | Doolittle | Dec. 20, 1938 |
| 2,364,410 | Whittaker | Dec. 5, 1944 |
| 2,412,784 | Stewart et al. | Dec. 17, 1946 |
| 2,477,280 | Baldwin | July 26, 1949 |